March 31, 1931. E. ZIPPERLE 1,798,445
ROLLER BLIND
Filed Dec. 23, 1929 3 Sheets-Sheet 1

Eugen Zipperle
Inventor
by Francis Marburg
Attorney

March 31, 1931.  E. ZIPPERLE  1,798,445
ROLLER BLIND
Filed Dec. 23, 1929  3 Sheets-Sheet 3

Eugen Zipperle
Inventor
Francis Marburg
Attorney.

Patented Mar. 31, 1931

1,798,445

UNITED STATES PATENT OFFICE

EUGEN ZIPPERLE, OF ASPERG, GERMANY

ROLLER BLIND

Application filed December 23, 1929, Serial No. 416,087, and in Germany January 4, 1929.

This invention relates to a roller blind, especially blinds on the rear window of limousines and other closed cars adapted to be lowered and raised by means of a pull element such as a wire cable to be operated from the driver's seat.

Such blinds make it possible for the driver of the car to overcome the dazzling effect of the head lights of a car travelling behind him, but the blind can, if necessary, also be raised from the driver's seat when no dazzling is to be feared. The raising of the blind from the driver's seat is particularly important for example when it is desired to run backwards. The invention is however not restricted to roller blinds for cars but can be used in all cases where a roller blind was hitherto employed.

An essential feature of the invention consists in that all constructional parts for operating and locking the blind roller may be arranged inside the blind roller. A further advantage consists of the fact that the pulling means for operating the roller and for releasing the locking mechanism are not continually under strain.

Several embodiments of the invention are illustrated by way of example in the accompanying drawing in which Figs. 1, 2, 3 and 4 are separate portions of a longitudinal section through a roller blind.

Figure 1:
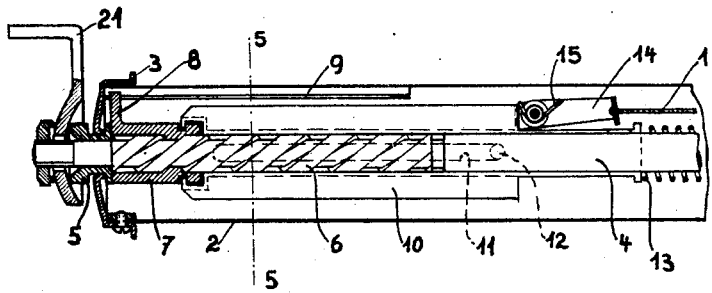
Figure 2:
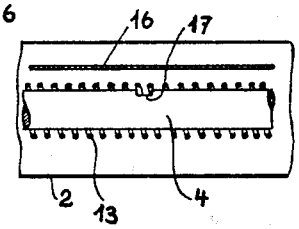
Figure 3:
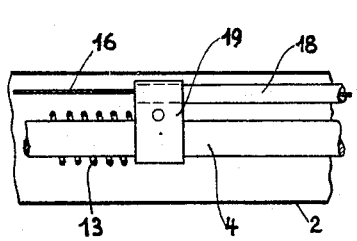
Figure 4:
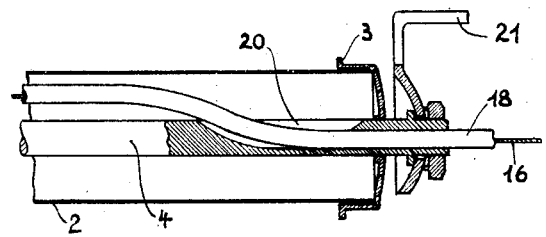
Figure 5:
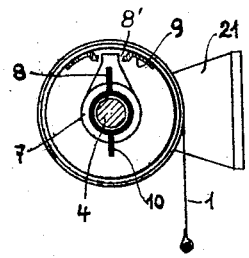
Fig. 5 is a section on line 5—5 of Fig. 1.

In the form of construction shown in Figs. 1 to 5 the blind 1 is fastened on the roller 2. This roller is provided on both sides with bearing covers 3 of which one rotate directly on an axle 4 and the other on a sleeve 5. A nut 7 runs on a screw thread 6 on one end of the axle 4. An extension 8 of this nut 7 engages as a catch in the longitudinal slot 8' of a bow 9 rigidly connected with the roller 2, this bow forming a guide for the extension 8. A sleeve 10 composed of two halves is slidably mounted on the axle 4 and secured against rotation by its longitudinal slot 11 and a pin 12. The slidable element formed by the sleeve 10 is acted upon by a pressure spring 13. The sleeve 10 is rotatably connected with the nut 7. On the other side of the sleeve 10 a catch 14 is hingedly mounted. A spring 15 tends to press the catch 14 through an opening in the sleeve 10 against the axle 4. A notch 17 is provided in the axle 4 in which the catch 14 engages when it is situated thereover and when the pull wire 16 is not tensioned. If the sleeve 10 is pulled sufficiently far forward by the pull wire 16 the catch 14 can hook tightly into the notch 17 of the axle 4 on the wire 16 being suddenly released. The protection cover 18 of the pull element 16 is fastened to the axle 4 by means of a double pipe clip 19 on which the pressure spring 13 is supported and is centered by a hollowed out portion 20 and a bore in the axle. The axle 4 is mounted in two angle pieces 21.

Figure 6:
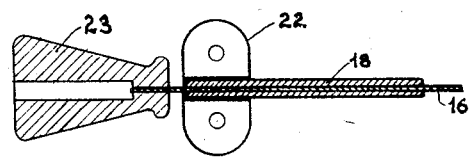
Fig. 6 shows the operating device for the roller blind.
Figure 7:
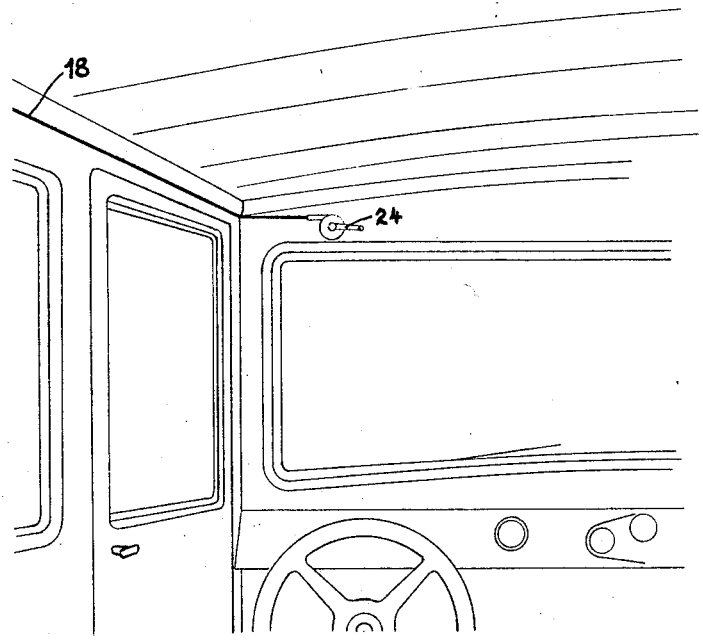
Fig. 7 shows the arrangement of another operating device above the driver's seat of a car.
Figure 8:
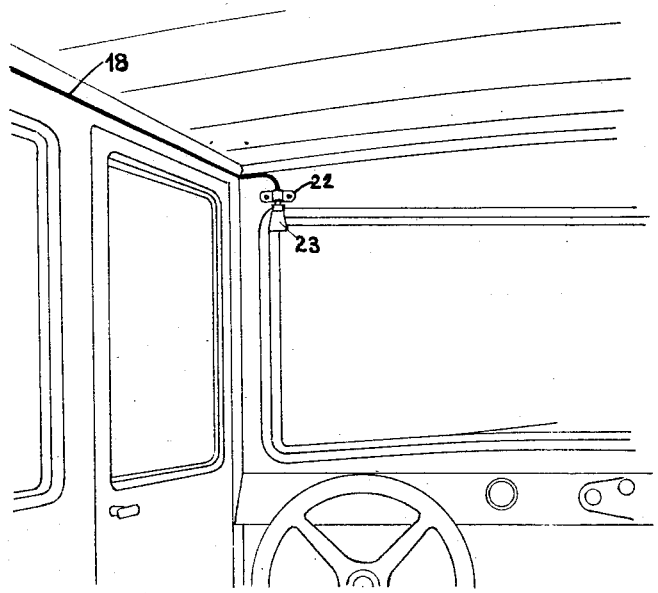
Fig. 8 shows the arrangement of the operating device according to Fig. 6 within the reach of the driver's seat.
Figure 9:
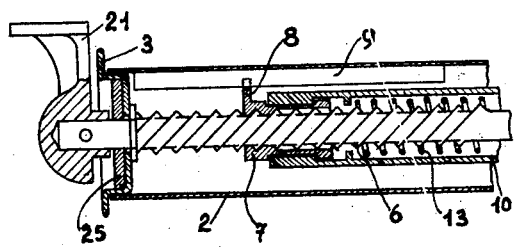
Figs. 9, 10 and 11 are portions of a longitudinal section of another form of construction according to the invention.

Fig. 6 shows the manner in which the end of the cover 18 surrounding the wire 16 is inserted in a bearing bracket 22. The pull wire 16 is extended over the bearing bracket 22. An operating knob 23 is fastened on its end. Contrary to the constructional example illustrated in Figs. 6 and 8 the operation of the roller blind is effected by a turning movement in the construction shown in Fig. 7. The end of the pull wire is wound over a drum which can be actuated by a crank 24.

The operation of the device is as follows:

The pull exerted by the knob 23 or the crank 24 is transmitted by the wire 16 over the catch 14 onto the sleeve 10 whereby the catch 14 is first raised against the action of the spring 15 into the position shown in Fig. 1. A further pull moves the sleeve 10 against the counter pressure of the spring 13 in the direction of the notch 17 causing the nut 7 which is carried along to turn on the high pitched thread 6 and this movement is transmitted over the guide 9 onto the roller 2. Consequently the blind 1 descends owing to the weight provided thereon and covers the rear window of the car. After travelling the distance necessary for obtaining the necessary rotation the rear end of the longitudinal slot 11 of the sleeve 10 comes in contact with the stationary pin 12. In this extreme position the end portion of the hook 14 has already travelled a short distance over the notch 17. If the wire 16 be suddenly released the tensioned spiral pressure spring 13 tends to press back the sleeve 10 into its left hand position. The sleeve 10 is however prevented from travelling towards the left owing to the fact that the catch 14 rests under the action of the spring 15 in the notch 17. The roller is thus stopped and the blind remains unwound.

If it is desired to again wind up the blind it will be sufficient to exert a sharp pull in order to lift the catch 14 out of the notch 17 and allow the sleeve 10 to be acted upon by the tensioned spring 13 which then rolls up the blind.

Naturally it is also possible to lock the roller blind independently of the operating knob 23 or the operating crank 24 by pulling the material of the blind. In this instance the rotated nut 7 pushes the sleeve 10 in the direction of the notch 17 until the catch 14 drops into the notch. For raising the blind it is sufficient to exert a jerk thereon, thereby lifting the catch 14.

In the form of construction shown in Figs. 9 to 13 the lowered blind is prevented from raising by a catch mounted on the axle in the event of slow release of the pull element, whereas by quick releasing of the pull element the raising of the blind is effected. This kind of operation is more reliable than that necessary with the construction shown in Figs. 1 to 5 and can be carried out without any special skill.

Figure 10:
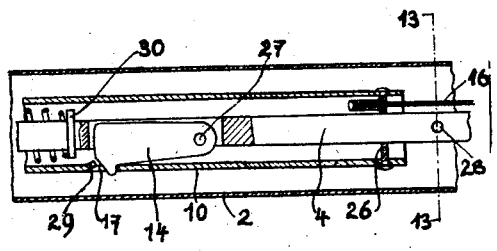
Figure 11:
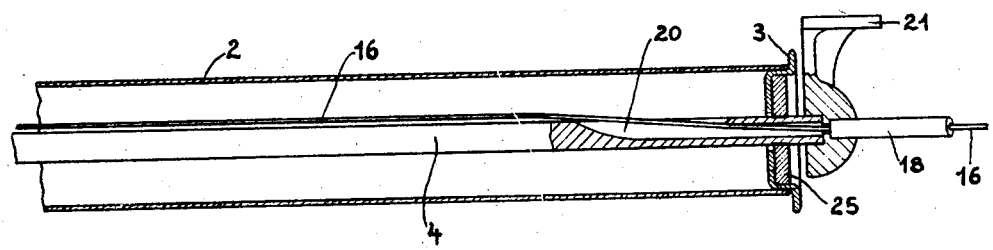

The axle 4 preferably of square section iron having a high pitched screw thread 6 is mounted stationary in bearing brackets 21. The roller 2 on which the blind material not shown in the drawing is wound has a bearing cover 3 at each end, the sound absorbing running plates 25 of which run on journals of the axle 4. The screw nut 7, claws 8 of which are guided by the bar 9 of the roller 2, runs on the high pitched screw thread 6. One end of the sleeve 10 engages rotatably over the screw nut 7 and has at its other end a disc 26 with a square hole guiding the sleeve 10 on the axle 4 and securing same against rotation. The pull wire 16 is fastened to the disc 26. On the axle 4 the catch 14 is oscillatably mounted on the pin 27. It engages by gravity in the slot 17 of the sleeve 10 as soon as this latter is pulled by the pull wire 16 up to the stop 28 limiting its movement and is then slowly released (Fig. 10). The disengaging of the catch 14 is facilitated in the manner hereinafter described by inclined flaps 29 of the sleeve 10. The spiral spring 13 bears at one end against the sleeve 10 and at the other end against a stationary disc 30 on the axle 4. The protecting cover of the pull element 16 is fastened in the right hand bearing bracket 21.

The operation of the form of construction shown in Figs. 9 to 13, which apart from the differences indicated above corresponds with the first form of construction, is as follows: The pull on the wire 16 effected by means of a hand crank, knob or similar operating means causes the sleeve 10 to move against the action of the spring 13 in longitudinal direction and thereby rotates the screw nut 7 which is carried along; the blind consequently unwinds.

Figure 12:
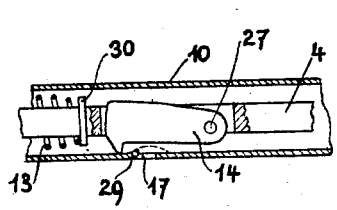
Fig. 12 shows details of the form of construction shown in Figs. 9, 10 and 11.
Figure 13:
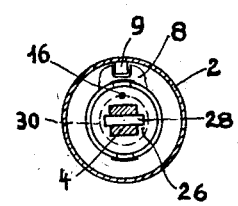
Fig. 13 is a cross section on line 13—13 of Fig. 10.

When the sleeve 10 has been pulled forward so far that the catch 14 can engage with its nose in the slot 17 the blind is held. In this position (Fig. 10) a space exists between the disc 26 and the stop 28. In practical use however the pull wire 16 is pulled until the stop 28 is noticeable. The catch 14 is then again lifted from its locking position and rests on the inner wall of the sleeve 10 (Fig. 12). If the pull wire 16 is now released the sleeve 10 moves slightly back under the action of the spring 13, the nose of the catch 14 slides along the inclined flap 29 and finally falls into the slot 17. The lowered blind is thus reliably held.

The releasing is effected by a pull on the pull wire 16 causing the disc 26 to come against the stop 28. Thus the catch 14 owing to the inclined surface of the nose is lifted out of the slot 17 and assumes the position shown in Fig. 12. A sudden releasing of the pull wire 16 now effects a springing back of the sleeve 10 causing the catch 14 to be swung up by the inclined flap 29 and upon again dropping slides on the inner wall of the sleeve 10. The path traversed by the point of the catch 14 is shown in dotted lines in Fig. 12.

The rotation which according to the above statement is designed to effect rolling up of the curtain can also be used for unrolling the same. In this case the reversed rotation has to effect the rolling up of the curtain. Other locking devices may be used than those described by way of example, without departing from the scope of the invention. The locking devices might also be arranged on the outer side of the rollers.

I claim:—

1. A roller blind, comprising in combination a rotatable roller, a worm mounted in said roller, a nut adapted to travel on said worm, an extension of said nut engaging with a guide of said roller, an element slidable in the axial direction of said worm rotatably connected with said nut, a spring tending to force said element into one extreme position, a pulling means adapted to shift said element into its other extreme position against the action of said spring, and a locking device adapted to hold said sliding element in one of its extreme positions.

2. A roller blind, comprising in combination a rotatable roller, an axle extending through and carrying said roller, a worm thread on said axle, a nut adapted to travel on said worm, an extension on said nut, a guide on the inside of said roller engaging with said extension, a sleeve slipped over and guided by said axle on which said nut is rotatably mounted, a spiral pressure spring also slipped over said axle tending to press said sleeve against said nut, a pulling means adapted to shift said sleeve against the action of said pressure spring, and a locking device adapted to hold said sleeve in position when the spring is compressed.

3. A roller blind, comprising in combination a rotatable roller, an axle extending through and carrying said roller, a worm thread on said axle, a nut adapted to ride on said worm, an extension on said nut guided on the inside of said roller, an element having an opening, slidable in the longitudinal direction of said axle, connected with said nut, a spring tending to press said element against said nut, a pulling means adapted to shift said element together with said nut against the action of said spring, and a catch bearing against the wall of said slidable element adapted to engage in the opening of said element.

4. A roller blind adapted to be mounted on the rear window of a closed motor-car to be operated from the driver's seat, comprising in combination a rotatable roller, an axle carrying said roller having a bore, a spring mounted in said roller tending to force said roller in one direction, a pulling means extending through the bore of said axle adapted to tension the spring in the inside of said roller, and a locking device inside said roller adapted to prevent the turning of said roller when said spring is tensioned.

5. A roller blind on the rear window of a closed motor-car adapted to be operated from the driver's seat, comprising in combination a rotatable roller, an axle having a bore mounted on said roller, a worm in said axle, a nut adapted to ride on said worm, an extension on said nut, a guide on the inside of said roller adapted to guide said extension, an element movable in the axial direction of said worm rotatably connected with said worm, a spring tending to press said element against said nut, a pulling means adapted to displace said nut and said element against the action of said spring guided in the inside of the axle through the bore in said axle, and a locking device adapted to prevent the rotation of said roller when said spring is tensioned.

6. A roller blind on the rear window of a closed motor-car adapted to be operated from the driver's seat, comprising in combination a rotatable roller, an axle with a bore carrying said roller mounted on said roller, a worm on said axle, a nut adapted to ride on said worm, an extension on said nut, a guide on the inside of said roller adapted to guide said nut, an element shiftable in axial direction of said worm rotatably connected with said nut, a spring tending to press said element against said nut, a pulling means, a catch mounted on said element fastened to said pulling means, a spring tending to press said catch into a notch when said catch is over said notch, said pulling means guided in the inside of said roller in the bore of said axle.

7. A roller blind, comprising in combination a rotatable roller, an axle having a bore extending through and carrying said roller, a worm thread on said axle, a nut adapted to ride on said worm, an extension on said nut guided inside said roller, an element having an opening slidable in the longitudinal direction of said axle rotatably connected with said nut, a spring tending to press said element against said nut, a pulling means adapted to displace said element together with said nut against the action of said spring, a catch bearing against the wall of said displaceable element adapted to engage in the opening of said element, said pulling means being guided inside said roller in the bore in the axle carrying said roller.

8. A roller blind, comprising in combination a rotatable roller, an axle having a bore extending through and carrying said axle, a worm thread on said axle, a nut adapted to ride on said worm, an extension on said nut guided on the inside of said roller, an element having an opening displaceable in the longitudinal direction of said axle rotatably connected with said nut, a spring tending to press said element against said nut, a pulling means adapted to displace said element with said nut against the action of said spring, a catch bearing against the wall of said displaceable element adapted to engage in the opening in said element, said pulling means being guided in the bore of the axle carrying said roller, and a protecting cover enclosing the parts of said pulling means outside of said roller.

9. A roller blind on the rear window of a closed motor car adapted to be operated from the driver's seat, comprising in combination a rotatable roller, an axle extending through and carrying said roller, a worm thread on said axle, a nut adapted to travel on said worm, means on said nut adapted to transmit its turning movement in both directions to said roller, an element slidable in the longitudinal direction of said axle rotatably connected with said nut, a pulling means adapted to displace said element, together with said nut in one direction against the action of a spring, said spring tending to displace the nut in the opposite direction.

EUG. ZIPPERLE.